UNITED STATES PATENT OFFICE.

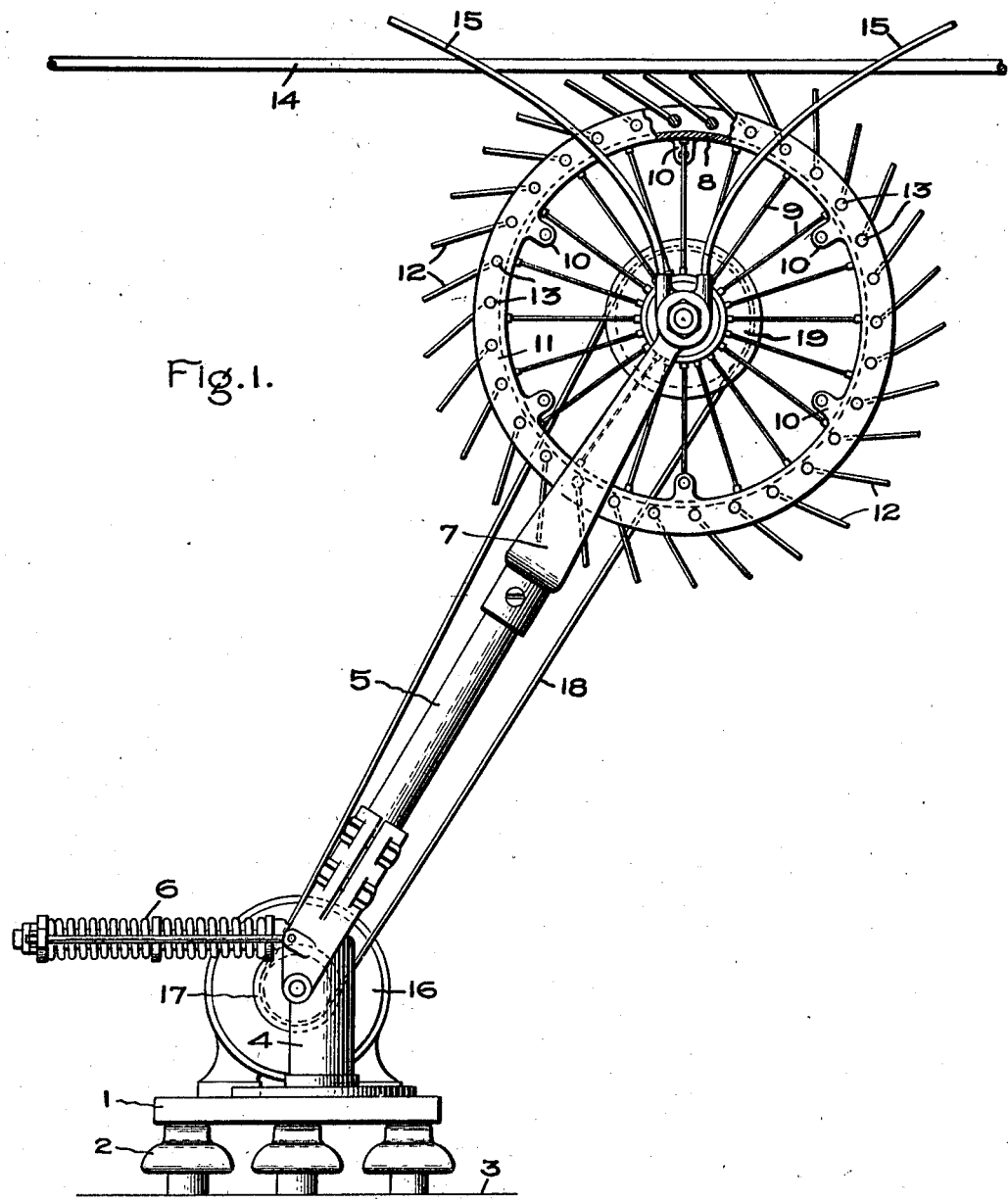

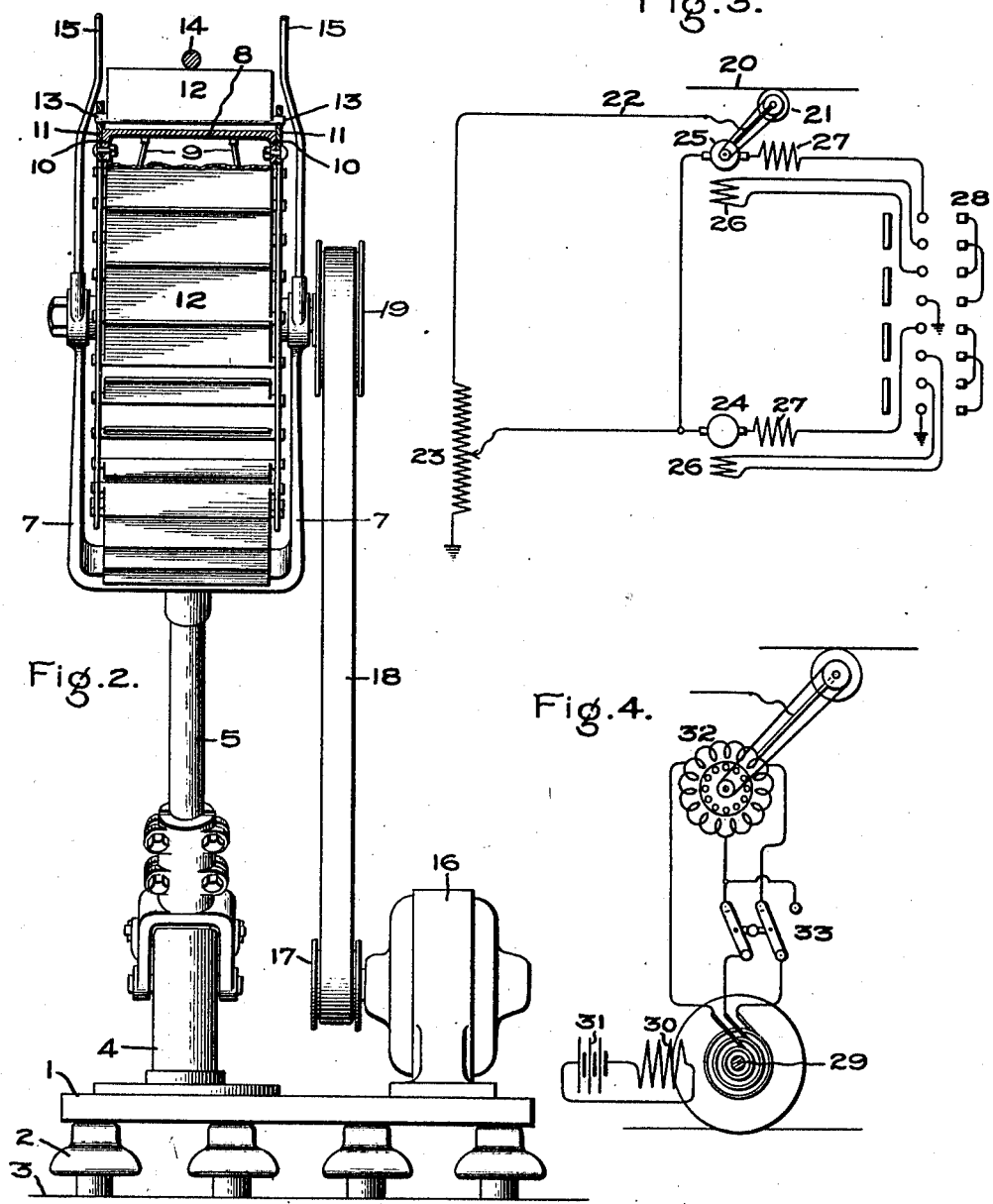

ALBERT H. ARMSTRONG, OF SCHENECTADY, NEW YORK, ASSIGNOR TO GENERAL ELECTRIC COMPANY, A CORPORATION OF NEW YORK.

HIGH-SPEED TROLLEY.

1,003,862. Specification of Letters Patent. Patented Sept. 19, 1911.

Application filed September 3, 1908. Serial No. 451,489.

*To all whom it may concern:*

Be it known that I, ALBERT H. ARMSTRONG, a citizen of the United States, residing at Schenectady, county of Schenectady, State of New York, have invented certain new and useful Improvements in High-Speed Trolleys, of which the following is a specification.

This invention relates to electric railways, and its object is to provide a trolley which will operate successfully at high speeds.

It has been found that the ordinary trolley wheel, bow, pan, or roller will not follow the vertical inequalities of an overhead conductor when the car is running at sixty miles an hour or more, but jumps at every suspension point, touching the wire only at the low portions thereof. This is due, of course, to the inertia of the trolley, and it results in a large amount of wear, not only from the arcing but from the friction between the collector and the trolley wire. A collector of hard copper scrapes off thin slivers or particles from the trolley wire which are instantly melted by the heat due to the excessive friction. The molten metal runs down and congeals on the collector forming a lump which eventually interferes with the proper operation of the trolley. If the collector is made of a softer self-lubricating metal or alloy it is soon cut through by the trolley wire. The problem is still further complicated by the employment of high tension alternating currents on the working conductor, and it has not been wholly solved by the catenary suspension of the trolley wire.

My invention aims to remedy these troubles by providing a trolley in which the wheel is of large diameter and carries on its periphery light contact making means capable of being thrown out by centrifugal force when the wheel is rotated at high speed. When so thrown out the contact-making means will strike against the trolley wire and collect the current therefrom. The trolley wheel is rotated by suitable mechanism, preferably an electric motor taking current either from the trolley wire or from an alternating current generator mounted on the car axle, the apparatus being so proportioned as to the number of poles in the motor, the diameter of the trolley wheel, etc., that the peripheral speed of the trolley wheel will be practically the same as the tangential speed at which the wheel moves along the wire.

In the accompanying drawing, Figure 1 is a side elevation of an overhead trolley embodying my invention; Fig. 2 is a rear elevation of the same; and Figs. 3 and 4 are diagrams of circuits for operating the motor from single phase and three phase lines, respectively.

The trolley illustrated is designed for use with an overhead conductor, and for the sake of convenience the following description will be confined to such a structure; but it should be clearly understood that I do not limit the invention to overhead trolleys but contemplate its use with other line structures, such, for instance, as third rail systems.

In the form shown, the trolley is mounted on a base 1 which is supported by insulators 2 on the car-top 3. On said base is a stand 4 to which is pivoted the lower bifurcated end of the trolley pole 5. The customary spring 6 urges the pole upward. The upper end of the pole has a wide deep fork whose arms 7 support the horizontal shaft or axle of the trolley wheel, which is preferably composed of a wide thin rim 8 of sheet metal supported on wire spokes 9. The rim has inwardly projecting lugs 10 at intervals along its edges, by means of which two annular side plates 11 are secured to said rim forming outwardly projecting flanges therefor. Light movable contact elements are supported by said flanges, being preferably flat blades 12 of sheet metal having trunnions 13 at their inner corners, which are journaled in holes in the flanges 11. When the wheel is rotated rapidly these blades fly outward, as indicated in Fig. 1, and make contact with the conductor 14. Instead of the flat blades shown, I may use other equivalent contact-making devices, such as wires, chains, springs, loose bands or belts, etc., the only requirements being that the contact making device shall be light in weight and capable of moving outwardly away from the wheel under the action of centrifugal force when said wheel is rotated rapidly.

In order to keep the wheel from slipping sidewise off the conductor, suitable guard arms 15 are secured to the arms 7 and extend up above the conductor 14 on each side of the wheel.

A motor 16 is mounted adjacent to the stand 4 and its belt pulley 17 is connected by a belt 18 to the pulley 19 on the shaft of the wheel, whereby said wheel can be revolved at a speed practically the same as, or a trifle greater than, the linear speed of the car along the track. The shaft of the motor is in line with the pivot on which the trolley pole swings up and down, so that such movement of the pole does not alter the distance between the belt pulleys.

It will be seen that with a peripheral speed of sixty miles an hour the centrifugal force at the rim of a wheel two feet in diameter is sufficient to press the contact elements up against the trolley wire with considerable pressure; amounting to sixty pounds for an element weighing four ounces. This is sufficient to keep the light contact elements always tilted outward; the air pressure, due to the rapid rotation of the wheel, causing them to assume a position somewhat between radial and tangential, as shown in Fig. 1, which may be regarded as an instantaneous view of the wheel when rotating at full speed. Under normal relations of the wheel and the trolley wire, the four or five topmost contact elements are in contact with the wire at the same time, being more or less depressed by the wire, so that if the wire lifts away from the wheel, as at a suspension hanger, the light contact elements instantly fly outward and remain in contact with it. Since the peripheral speed of the wheel is about the same as the travel of the car, the contact elements do not drag on the trolley wire, but merely come up and press against it. If desired, the wheel may be run a trifle faster or slower than the car in order to produce a slight wiping of the contact elements on the wire.

This invention, therefore, eliminates the wear due to friction, and prevents arcing by insuring the simultaneous contact of several contact elements with the wire, and by preventing the separation of the wheel from the wire at the high spots.

Fig. 3 shows one mode of connecting the trolley motor on a single phase railway car. Current is taken from the trolley wire 20 by the trolley 21 and thence by the wire 22 to the compensator 23, from which it proceeds to the car motor 24 and the trolley motor 25 in parallel. These motors are of the commutator type, having a series field winding 26 and a compensating coil 27. A single controller 28 operates to reverse the current in the field windings of both motors simultaneously.

Fig. 4 shows the car axle 29 equipped with a three phase generator having its field winding 30 energized by a battery 31. This generator supplies current to an induction motor 32 whose speed will be proportional to that of the car, so that by properly designing the gearing between the motor and the trolley wheel the latter can be run at the required speed, corresponding with that of the car at all times. A reversing switch 33 in two of the leads enables the motor to be reversed when the direction of the travel of the car is reversed.

What I claim as new and desire to secure by Letters Patent of the United States, is,

1. A high speed trolley wheel carrying contact means free to project outwardly by centrifugal force to make contact with the current conductor irrespective of its varying distances from the axis of the wheel.

2. A high speed trolley wheel having a plurality of contact members free to project outwardly by centrifugal force to make contact with the current conductor irrespective of its varying distances from the axis of the wheel, and means to positively rotate said wheel.

3. A high speed trolley wheel having a plurality of contact devices transversely mounted thereon with their entire contact portions freely movable outwardly under centrifugal force.

4. A high speed trolley wheel having spaced peripheral flanges, and a plurality of transverse contact blades pivotally connected at one edge to said flanges.

5. A high speed trolley comprising a wheel carrying on its periphery freely movable contact making means adapted to be projected outward by centrifugal force, a motor adjacent to said trolley, and operative mechanical connections between said motor and said wheel.

6. A high speed trolley comprising a pivoted arm, a trolley wheel journaled on said arm and carrying on its periphery freely movable contact making means adapted to be projected outward by centrifugal force, a motor having its axis in alinement with the pivotal axis of the trolley arm, and power transmitting means between said motor and said trolley wheel.

In witness whereof, I have hereunto set my hand this 2d day of September, 1908.

ALBERT H. ARMSTRONG.

Witnesses:
BENJAMIN B. HULL,
MARGARET E. WOOLLEY.